US008412614B2

(12) United States Patent
Bullinger et al.

(10) Patent No.: US 8,412,614 B2
(45) Date of Patent: Apr. 2, 2013

(54) SYSTEM AND METHOD FOR ELECTRICAL POWER DERIVATIVES

(75) Inventors: Chris Bullinger, Nashville, TN (US); Nicholas Bullinger, Minneapolis, MN (US); Fazli Qadir, Chicago, IL (US); Daniel Somers, Riverside, IL (US); Daniel R. Walker, Chicago, IL (US)

(73) Assignee: Cornerstone Energy Partners, LLC, Minneapolis, MN (US)

( * ) Notice: Subject to any disclaimer, the term of this patent is extended or adjusted under 35 U.S.C. 154(b) by 624 days.

(21) Appl. No.: 12/437,243

(22) Filed: May 7, 2009

(65) Prior Publication Data

US 2009/0281876 A1 Nov. 12, 2009

Related U.S. Application Data

(60) Provisional application No. 61/051,951, filed on May 9, 2008.

(51) Int. Cl.
 *G06Q 40/00* (2012.01)
(52) U.S. Cl. ......................................................... 705/37
(58) Field of Classification Search .................... 705/37, 705/35, 1
 See application file for complete search history.

(56) References Cited

U.S. PATENT DOCUMENTS

| | | | |
|---|---|---|---|
| 6,321,212 B1 | 11/2001 | Lange | |
| 7,089,190 B2 * | 8/2006 | Tsui | 705/63 |
| 7,343,360 B1 * | 3/2008 | Ristanovic et al. | 705/412 |
| 7,389,262 B1 | 6/2008 | Lange | |
| 7,634,441 B2 * | 12/2009 | Alvarado et al. | 705/37 |
| 2002/0184138 A1 * | 12/2002 | Adamson | 705/37 |
| 2004/0044613 A1 * | 3/2004 | Murakami et al. | 705/37 |
| 2005/0165512 A1 * | 7/2005 | Peljto | 700/291 |
| 2008/0228518 A1 * | 9/2008 | Braziel et al. | 705/1 |

FOREIGN PATENT DOCUMENTS

| | | | |
|---|---|---|---|
| CH | EP 1 322 020 A1 * | 12/2001 | |
| CH | EP 1 389 819 A1 * | 8/2002 | |

OTHER PUBLICATIONS

Yoon et al.: Congestion Management for Large Electric Power Systems, May 2000, Energy Laboratory Publication # MIT 00-003 WP, Energy Laboratory, MIT, Cambridge, MA, pp. 1-25.*
Deng, Shijie: Financial Methods in Competitive Electricity Markets, Fall 1999, Dessertation submitted for Doctor of Philosophy, University of California, Berkeley, CA, pp. 1-152.*
Deb et al.: A Case Study Using an MMOPF Model, Mar. 2000, LCG Consulting, pp. 1-14.*

* cited by examiner

*Primary Examiner* — Bijendra K Shrestha
(74) *Attorney, Agent, or Firm* — Foley & Lardner LLP

(57) ABSTRACT

A method, system and program product for facilitating trading derivatives of energy constraints, the method comprising in one embodiment: obtaining electronically historical constraint price data on transmission elements or groups of transmission elements over a number of respective time increments; performing electronically an algorithm calculation on the constraint prices for one of the transmission elements or one of the groups of transmission elements over a number of time increments within a given period of time, to obtain constraint price data for the one transmission element or group of transmission elements for the given period of time; performing this algorithm calculation step for a plurality of the periods of time to obtain constraint price data for each of the plurality of transmission elements or groups of transmission elements for the plurality of periods of time; and making accessible the constraint price data. The invention further includes market making embodiments, binding hours derivative embodiments, and load derivative embodiments. In a further embodiment, a method, system and program product for operating an electronic trading exchange for power derivatives is disclosed.

9 Claims, 11 Drawing Sheets

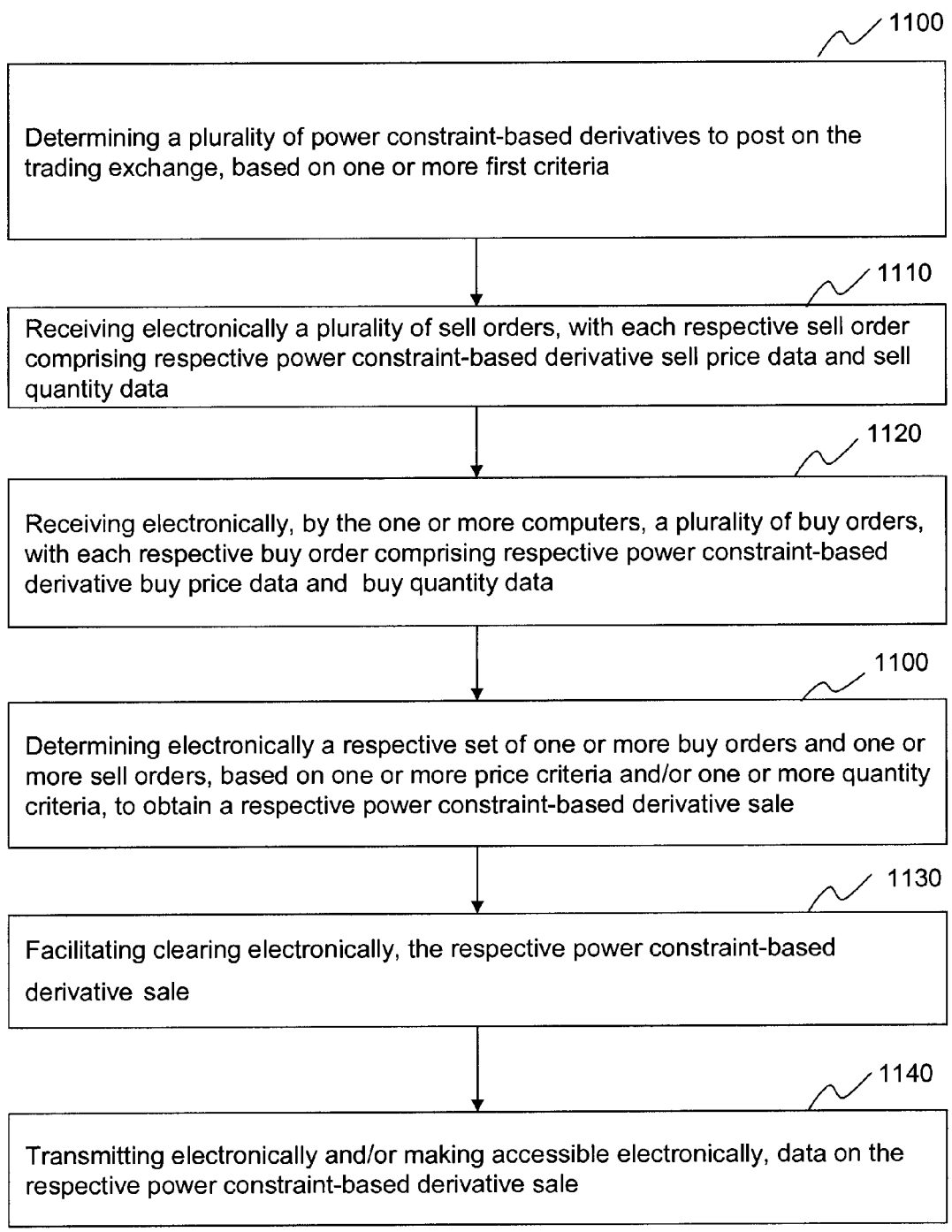

SYSTEM AND METHOD FOR ELECTRICAL POWER DERIVATIVES

RELATED APPLICATION

This application claims priority to and hereby incorporates into this application all of the subject matter of provisional application 61/051,951, filed on May 9, 2008, in its entirety as if fully set forth herein.

BACKGROUND OF THE INVENTION

The need for managing the price risk of electricity is greater than in many other markets because there is a high variation in the price of electricity over both time and space. There is a high variation in the price of electricity over time because it is difficult to store electric power, necessitating that the electricity be produced when demanded. Even under normal conditions, electricity prices may fluctuate widely over the course of a day. The high variation in the price of electricity over space is due to the physical nature of the power network. Power flow over a particular transmission line between two locations in an electric power network cannot be directly controlled unless highly specialized and generally expensive equipment is installed because electric power flows over all possible paths in accordance with their impedance. As a result, when electric power is transferred into or out of a power transmission grid, that transfer of power may affect the distribution of electricity on any transmission line in the network.

Congestion in the transmission system can have a significant effect on the price of electricity. When one transmission line in the network is loaded at or near its full capacity, power can be rerouted over a different transmission line to avoid the congested line only with economic consequences. Even if the transmission of power is congested between only two locations, that congestion potentially affects the prices of electricity at other locations in the network. The price of electricity downstream of the congested line tends to increase, encouraging additional power generation to be brought on line to serve the load downstream of the congested line. Meanwhile, the price of electricity upstream of the congested line will tend to decrease, discouraging power generation upstream of the congested line.

An Independent System Operator (ISO) or a Regional Transmission Operator (RTO) coordinates, controls and monitors the operation of the electrical power system. An RTO must meet the requirements set forth in Federal Energy Regulatory Commission (FERC) Order 2000. An ISO or RTO may cover parts of one or more states within the United States or neighboring countries.

As part of a functioning competitive electricity market, FERC Orders 888 and 889 define how Independent Power Producers (IPPs) and power marketers are allowed fair access to transmission systems, and mandates the implementation of the Open Access Same-Time Information System (OASIS) to facilitate the fair handling of transactions between electric power transmission suppliers and their customers.

Computer systems within both the ISOs and the RTOs generate a daily operating plan that determines for each time increment for the following day how much energy will be supplied by each generator, and maintain a record of the actual prices for each time increment for each transmission element under its purview.

As noted, the laws of nature, rather than the law of contracts, govern the power flows from electricity suppliers to consumers. By nature, electricity flows over the path of least resistance and will travel down whatever paths are made available to it. Because the suppliers and consumers of electricity are interconnected on the transmission grid, the voltage and current at any point are determined by the behavior of the system as a whole (i.e., impedance) rather than by the actions of any two individual market players adjusting generation or load on the system. Consequently, the delivery of 100 megawatts of electricity differs dramatically as compared to a simple fuel oil delivery in which 100 barrels of oil are physically piped or trucked between the oil supplier's depot and the consumer's facility.

Two different market designs are sometimes used for transmission services. The first approach assumes that it is more trouble than it is worth to charge each system user for the cost the user imposes on the system. In this case, external costs are apportioned to users according to local rules and FERC-approved transmission tariffs. If congestion cannot be fully managed using re-dispatch, the transmission operators use a priority system to decide who remains on line. Transmission costs are "socialized" (shared out to everyone) in this approach.

The second approach associates transmission charges with the costs each local power provider imposes on the system. The transmission system controller calculates a "constraint price" or "shadow price" of transmission on every congested line and then charges users according to their marginal contributions to congestion. Loosely, the shadow price is the change in the objective value of the optimal solution of an optimization problem obtained by relaxing the constraint by one unit. When a line becomes overloaded, system controllers redispatch the system, which increases the implicit price of using the line, until market participants voluntarily reduce the line loadings. A priority system for allocating transmission is not employed.

The advantages of this second approach are that all transmission users can see the economic impacts of their choices on all other users, and line capability is allocated to those who value it most. The chief disadvantage of the second approach is that the transmission price calculation is complex, expost, and can lead to significant price variations, depending on the level of system congestion.

Various approaches have been proposed to manage the above-described price risk of electricity. For example, a power generator can hedge against the risk that the price of electricity will fall at a particular electricity location via a forward contract. A power forward contract is a privately negotiated agreement between commercial parties containing a binding obligation to deliver electricity at a specified location and price. A significant disadvantage of forward contracts is that the market for forward contracts can be illiquid at particular locations. Forward markets achieve higher liquidity by concentrating the market activity into a few standard locations. There are thousands of different locations in the power network but only a few locations in which any forward liquidity exists. Therefore, it may be difficult for the generator to find a willing buyer of the forward contract at an acceptable price at its specific location.

SUMMARY OF THE INVENTION

In one embodiment, a system is disclosed for facilitating trading derivatives of energy constraints, comprising: a computer configured for: obtaining electronically historical constraint price data on transmission elements or groups of transmission elements over a number of respective time increments; performing an algorithm calculation on the constraint prices for one of the transmission elements or one of the groups of transmission elements over a number of time increments within a given period of time, to obtain constraint price data for the one transmission element or group of transmission elements for the given period of time; performing this algorithm calculation step for a plurality of the periods of time to obtain constraint price data for each of the plurality of transmission elements or groups of transmission elements for the plurality of periods of time; and making accessible electronically the constraint price data. In one embodiment, the algorithm is one selected from the group of summing, averaging, calculating a standard deviation, calculating a median.

In a further embodiment, the system comprises the computer configured for: selecting one or more periods of time for one or more transmission elements and/or one or more groups of transmission elements based on at least one criterion; and making accessible electronically the constraint price data for these selected periods of time. In one embodiment, the criterion is that the constraint price data for a given period of time exceeds a threshold. In another embodiment, the criterion is that the constraint price data for the transmission element or group of transmission elements exceeds a first threshold for a number of periods of time that exceeds a second threshold.

In a further embodiment, the system comprises the computer configured for obtaining electronically for a plurality of the transmission elements and/or groups of transmission elements historical outage data including a date or time; and making accessible electronically the historical outage data.

In a further embodiment, the system comprises the computer configured for: obtaining electronically for one of the transmission elements or one of the groups of transmission elements historical outage data including a date or time; correlating the historical constraint price data for that one transmission element or group of transmission elements with one or more outages in the historical outage data for that one transmission element or group of transmission elements to obtain outage historical constraint price data; and making accessible electronically the outage historical constraint price data for the one transmission element or group of transmission elements.

In a further embodiment, the system comprises the computer configured for sending electronically to one or more electronic addressees buy or sell offers for binding constraints for one or more periods of time for one or more transmission elements and/or groups of transmission elements.

In a further embodiment, the system comprises the computer configured to post the constraint price data on a website.

In a further embodiment, the system comprises the computer configured to send the constraint price data via instant messaging or via text messaging to one or more electronic addressees.

In a further embodiment, the system comprises the computer configured to: calculate a bid and/or an ask for the constraint price data on the transmission element or group of transmission element for a selected period of time; and make accessible electronically the bid and/or an ask for the constraint price data on the transmission element or group of transmission elements for the selected period of time.

In a further embodiment, the system comprises the computer configured to: calculate an option price for a strike price on a selected one of the transmission elements or one of the groups of transmission elements for a particular period of time; and make accessible electronically the option price on the selected transmission element or group of transmission elements for the particular period of time.

In a further embodiment, the system comprises the computer configured to determine a range of strike prices based at least in part on the constraint price data and volatility of the constraint price data.

In a further embodiment, the system comprises the computer configured to: obtain a weather forecast for one or more of the time increments in the future that forecasts a particular weather pattern; obtain electronically historical weather data that identifies weather patterns; select historical constraint price data for that one transmission element or group of transmission elements for time increments that are coincident with the occurrence of the weather pattern as determined from the historical weather data to obtain weather correlated historical constraint price data; calculate a constraint price based on the weather correlated historical constraint price data for one or more of the time increments in the future for the transmission element or groups of transmission elements; and make accessible electronically the constraint price.

In another embodiment, a system is disclosed for facilitating trading derivatives of energy constraints, comprising: a computer configured for: accessing electronically constraint price data for a selected period of time for a selected transmission element and/or group of transmission elements, with the constraint price data comprising one or more results of calculating for the selected transmission element and/or group of transmission elements an algorithm on constraint prices associated with a number of time increments for the selected transmission element or group of transmission elements within a given period of time, to obtain the constraint price data for the selected transmission element or group of transmission elements for that period of time; calculating electronically a volatility for the constraint price data on the selected transmission element or group of transmission elements for the given period of time; determining an expected constraint price value for the constraint price data on the selected transmission element or group of transmission elements for the given period of time; and one selected from the group of posting a bid and/or an ask for the constraint price data on the selected transmission element or group of transmission elements for the given period of time, and determining an option price for a strike price on the selected transmission element or group of transmission elements for the given period of time.

In another embodiment, a system is disclosed for facilitating trading derivatives of energy constraints, comprising: a computer configured for: obtaining electronically historical binding data on one or more transmission elements or groups of transmission elements over a number of respective time increments; performing an algorithm calculation on the number of time increments that are binding for the transmission element or group of transmission elements within a given period of time, to obtain time increment binding data for the transmission element or group of transmission elements for that period of time; performing this algorithm calculation step over a plurality of periods of time to obtain time increment binding data for each of the plurality of transmission elements and/or groups of transmission elements for the plurality of periods of time; and making accessible electronically the time increment binding data.

In another embodiment, a system is disclosed for facilitating trading derivatives of energy constraints, comprising: a computer configured for: accessing electronically the time increment binding data for a selected period of time for a selected transmission element and/or group of transmission elements, with the time increment binding data comprising one or more results of calculating for the selected transmission element and/or group of transmission elements an algorithm on historical binding data associated with a number of time increments for the selected transmission element or group of transmission elements within a given period of time; calculating electronically a volatility for the time increment binding data for the selected transmission element or group of transmission elements for the given period of time; determining an expected value for the time increment binding data on the selected transmission element or group of transmission elements for the given period of time; and one selected from the group of posting a bid and/or an ask for the time increment binding data on the selected transmission element or group of transmission elements for the given period of time, and determining an option price for a strike price on the selected transmission element or group of transmission elements for the given period of time.

In another embodiment, a system is disclosed for facilitating trading derivatives of electrical load, comprising: a computer configured for: obtaining electronically historical data on electrical load by region over plurality of time increments; performing an algorithm calculation on the electrical load data for one of the regions for a number of the time increments to obtain electrical load data for that region for that period of time; performing this algorithm calculation step over a plurality of periods of time and a plurality of regions to obtain electrical load data for a plurality of regions for a plurality of periods of time; and making accessible electronically the electrical load data for each of a plurality of the regions over the plurality of periods of time.

In another embodiment, a system is disclosed for facilitating trading derivatives of energy constraints, comprising: a computer configured for: accessing electronically electrical load data for a selected period of time and a selected region, where the electrical load data comprises electrical load data for a plurality of time increments for the selected region combined using an algorithm over the selected period of time to obtain the electrical load data for the region for the selected period of time; calculating electronically a volatility for electrical load data; determining an expected value for the electrical load data based at least in part on the electrical load data for a selected period of time and a selected region and the volatility; and one selected from the group of posting a bid and/or an ask for the electrical load data for the given period of time for the selected region, and determining an option price for the electrical load data for a given period of time for the selected region.

In another embodiment, a method is disclosed for facilitating trading derivatives of energy constraints, comprising: obtaining electronically historical constraint price data on transmission elements or groups of transmission elements over a number of respective time increments; performing electronically an algorithm calculation on the constraint prices for one of the transmission elements or one of the groups of transmission elements over a number of time increments within a given period of time, to obtain constraint price data for the one transmission element or group of transmission elements for the given period of time; performing this algorithm calculation step for a plurality of the periods of time to obtain constraint price data for each of the plurality of transmission elements or groups of transmission elements for the plurality of periods of time; and making accessible the constraint price data.

In another embodiment, a method is disclosed for facilitating trading derivatives of energy constraints, comprising: accessing electronically constraint price data for a selected period of time for a selected transmission element and/or group of transmission elements, with the constraint price data comprising one or more results of calculating for the selected transmission element and/or group of transmission elements an algorithm on constraint prices associated with a number of time increments for the selected transmission element or group of transmission elements within a given period of time, to obtain the constraint price data for the selected transmission element or group of transmission elements for that period of time; calculating electronically a volatility for the constraint price data on the selected transmission element or group of transmission elements for the given period of time; determining an expected constraint price value for the constraint price data on the selected transmission element or group of transmission elements for the given period of time; and one selected from the group of posting a bid and/or an ask for the constraint price data on the selected transmission element or group of transmission elements for the given period of time, and determining an option price for a strike price on the selected transmission element or group of transmission elements for the given period of time.

In another embodiment, a method is disclosed for facilitating trading derivatives of energy constraints, comprising: obtaining electronically historical binding data on one or more transmission elements or groups of transmission elements over a number of respective time increments; performing an algorithm calculation on the number of time increments that are binding for the transmission element or group of transmission elements within a given period of time, to obtain time increment binding data for the transmission element or group of transmission elements for that period of time; performing this algorithm calculation step over a plurality of periods of time to obtain time increment binding data for each of the plurality of transmission elements and/or groups of transmission elements for the plurality of periods of time; and making accessible the time increment binding data.

In another embodiment, a method is disclosed for facilitating trading derivatives of energy constraints, comprising: accessing electronically the time increment binding data for a selected period of time for a selected transmission element and/or group of transmission elements, with the time increment binding data comprising one or more results of calculating for the selected transmission element and/or group of transmission elements an algorithm on historical binding data associated with a number of time increments for the selected transmission element or group of transmission elements within a given period of time; calculating electronically a volatility for the time increment binding data for the selected transmission element or group of transmission elements for the given period of time; determining an expected value for the time increment binding data on the selected transmission element or group of transmission elements for the given period of time; and one selected from the group of posting a bid and/or an ask for the time increment binding data on the selected transmission element or group of transmission elements for the given period of time, and determining an option price for a strike price on the selected transmission element or group of transmission elements for the given period of time.

In another embodiment, a method is disclosed for facilitating trading derivatives of electrical load, comprising: obtaining electronically historical data on electrical load by region over plurality of time increments; performing an algorithm calculation on the electrical load data for one of the regions for a number of the time increments to obtain electrical load data for that region for that period of time; performing this algorithm calculation step over a plurality of periods of time and a plurality of regions to obtain electrical load data for a plurality of regions for a plurality of periods of time; and making accessible the electrical load data for each of a plurality of the regions over the plurality of periods of time.

In another embodiment, a method is disclosed for facilitating trading derivatives of energy constraints, comprising: accessing electronically electrical load data for a selected period of time and a selected region, where the electrical load data comprises electrical load data for a plurality of time increments for the selected region combined using an algorithm over the selected period of time to obtain the electrical load data for the region for the selected period of time; calculating electronically a volatility for electrical load data; determining an expected value for the electrical load data based at least in part on the electrical load data for a selected period of time and a selected region and the volatility; and one selected from the group of posting a bid and/or an ask for the electrical load data for the given period of time for the selected region, and determining an option price for the electrical load data for a given period of time for the selected region.

In yet a further embodiment, a system is disclosed for an electronic trading exchange for power constraint-based derivatives, comprising: one or more computers, comprising memory, wherein the memory stores computer-readable instructions that, when executed, cause the one or more computers to perform the steps: determining a plurality of power constraint-based derivatives to post on the trading exchange, based on one or more first criteria; receiving electronically a plurality of sell orders, with each respective sell order comprising respective power constraint-based derivative sell price data and sell quantity data; receiving electronically a plurality of buy orders, with each respective buy order comprising respective power constraint-based derivative buy price data and buy quantity data; determining electronically a respective set of one or more buy orders and one or more sell orders, based on one or more price criteria and/or one or more quantity criteria, to obtain a respective power constraint-based derivative sale; facilitating clearing electronically the respective power constraint-based derivative sale; and transmitting electronically and/or making accessible electronically data on the respective power constraint-based derivative sale.

In a further embodiment, one of the one or more first criteria comprises a liquidity value, the determining a plurality of power constraint-based derivatives to post step comprises: calculating the liquidity value of one or more of the power constraint-based derivatives based on a threshold.

In a further embodiment, one of the one or more first criteria comprises a liquidity value, and the determining a plurality of power constraint-based derivatives to post step comprises: calculating the liquidity value of one or more of the power constraint-based derivatives based on a threshold set for power constraint-based derivative price, or power constraint-based derivative hours.

In a yet further embodiment, a method is disclosed for operating an electronic trading exchange for power constraint-based derivatives, comprising: determining a plurality of power constraint-based derivatives to post on the trading exchange, based on one or more first criteria; receiving electronically, by the one or more computers, a plurality of sell orders, with each respective sell order comprising respective power constraint-based derivative sell price data and sell quantity data; receiving electronically, by the one or more computers, a plurality of buy orders, with each respective buy order comprising respective power constraint-based derivative buy price data and buy quantity data; determining electronically, by the one or more computers, a respective set of one or more buy orders and one or more sell orders, based on one or more price criteria and/or one or more quantity criteria, to obtain a respective power constraint-based derivative sale; facilitating clearing electronically, by the one or more computers, the respective power constraint-based derivative sale; and transmitting electronically and/or making accessible electronically, by the one or more computers, data on the respective power constraint-based derivative sale.

BRIEF DESCRIPTION OF THE DRAWINGS

FIG. 11 is a schematic block diagram of an implementation of the invention.

DETAILED DESCRIPTION OF THE PREFERRED EMBODIMENTS

Definitions

"constraint price" means a transmission charge related to the costs each user imposes on the system. The transmission system controller calculates a "price," sometimes referred to as a "shadow price" of transmission on every congested line and then charges users according to this congestion.

"binding constraint" is an indication of congestion on a transmission element or group of transmission elements that will lead to an increased cost of electricity propagating through that transmission element or group of transmission elements.

Binding constraints on an electric transmission system are posted by Independent System Operators (ISO) or Regional Transmission Organizations (RTO) and potentially other governmental and non-governmental organizations. The binding constraints lead to increases in electricity prices and congestion prices in the Day Ahead, Hour Ahead and Real Time markets. In many cases, constraint prices or shadow prices—which represent the economic impact of the binding constraint—are also reported by the ISO or RTO.

A derivative based on a binding constraint would comprise, in one embodiment, an instrument that may be valued based on constraint prices or shadow prices for a binding constraint for each time increment. In another embodiment, the derivative may be based on a swap around a contract number of binding hours per time period. The hours that the constraint actually binds and the shadow prices for that constraint are reported by the ISO or RTO.

For the first embodiment, where the instrument settles based on shadow prices: the shadow prices as reported by the ISO would be summed for a particular constraint for the relevant time period.

In the second embodiment, where the instrument is a swap around a number of hours the constraint binds: the value of the derivative would be determined by summing the hours that the constraint binds as reported by the ISO during the time period and netting the contract number of hours. For example, if a binding constraint (or set of binding constraints) is typically in effect for 100 hours in July, the contract may trade at around 100 hours. One party would pay the other for every hour that the constraint was binding that exceeded (or fell short of) 100 hours during the month of July.

Figure 1:
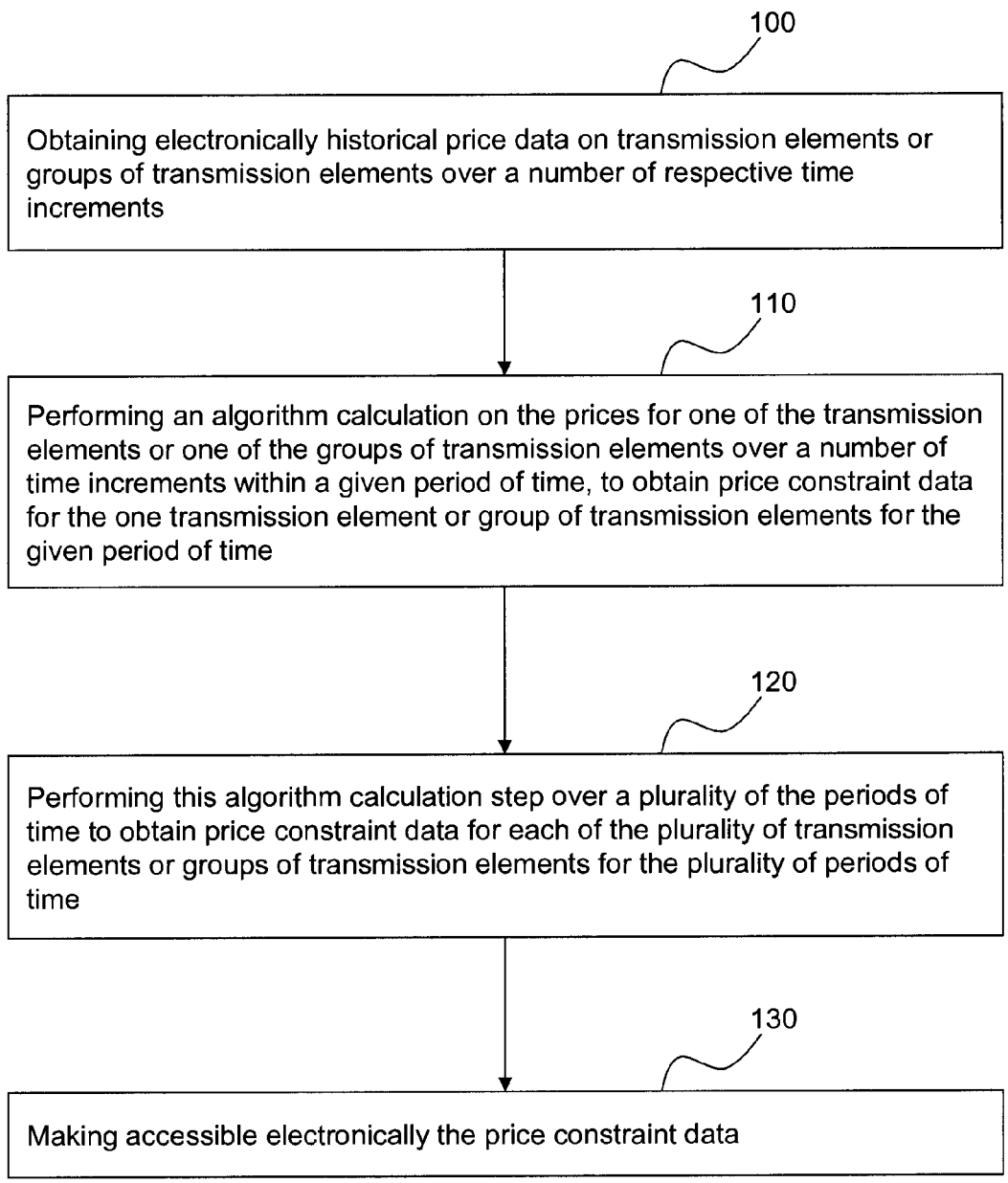
FIG. 1 is a flowchart for one embodiment of the invention.

Referring now to FIG. 1, this figure represents the system operations, program product code and method steps for one embodiment of the invention. This embodiment relates to obtaining and manipulating constraint price data in order to permit financial derivative instruments to be created and offered. Block 100 comprises an operation of obtaining electronically historical constraint price data on transmission elements or groups of transmission elements over a number of respective time increments. This historical constraint price data may be obtained by accessing an electronic database maintained by an Independent System Operator (ISO), Regional Transmission Organization (RTO) or other governmental or non-governmental organization. Alternatively, this historical constraint price data may be accessed from a publication and placed into electronic form.

Note that the historical constraint price data may be received in sorted form, e.g., sorted by transmission element or groups of transmission elements. In the event the historical constraint price data is not received in sorted form, the historical constraint price data may be sorted by transmission element or groups of transmission elements.

Block 110 comprises the operation of performing an algorithm calculation on the historical constraint prices for one of the transmission elements or one of the groups of transmission elements over a number of time increments within a given period of time, to obtain constraint price data for the one transmission element or group of transmission elements for the given period of time. The algorithm may comprise, by way of example, a summing algorithm wherein each of the constraint prices for time increments of an hour for the one transmission element or group of transmission elements are summed for a period of time, such as a day, a weekend, a week, a peak power demand period, a month, a season, to name a few, to obtain the price constraint data. Alternatively, the algorithm may be an averaging algorithm, a standard deviation calculating algorithm, or a median calculating algorithm. By way of example, the average or median for the constraint price for the time increment would be calculated, and this value would be multiplied by the number of time increments in the period of time of interest, e.g., hours in a day.

Block 120 comprises the operation of performing the algorithm used in the calculation operation for a plurality of the periods of time to obtain constraint price data for each of the plurality of transmission elements or groups of transmission elements for the plurality of periods of time.

Block 130 comprises the operation of making accessible electronically the constraint price data for the plurality of transmission elements or groups of transmission elements. The electronic accessibility may be obtained by posting the constraint price data on a secure password-controlled website, or posting via instant messaging to one or more electronic addressees, allowing a download of the constraint price data from the Internet, or may comprise sending electronically or by mail the constraint price data.

In one embodiment, further operations may include selecting one or more periods of time for one or more transmission elements and/or one or more groups of transmission elements based on at least one criterion, and then making accessible electronically the constraint price data for these selected periods of time. The purpose of these operations is to determine the periods of time when the binding constraints on the transmission element or group of transmission elements are in effect. For example, high power usage that causes transmission element constraints may occur during the summer months due to air conditioner use. To make this determination, in one embodiment the criterion may be that the constraint price data for a given period of time exceeds a threshold. In a further embodiment, the criterion may be that the constraint price data for the transmission element or group of transmission elements exceeds a first threshold for a number of periods of time that exceeds a second threshold. This second criterion is for detecting the transmission elements or groups of transmission elements and the periods of time where the binding constraints occur the most often.

In a further embodiment, a computer-implemented operation is provided of obtaining electronically for a plurality of the transmission elements and/or groups of transmission elements historical outage data including a date or time, and making accessible electronically the historical outage data.

In a further embodiment, a computer-implemented operation is provided of obtaining electronically for one of the transmission elements or one of the groups of transmission elements historical outage data including a date or time, correlating the historical constraint price data for that one transmission element or group of transmission elements with one or more outages in the historical outage data for that one transmission element or group of transmission elements to obtain outage historical constraint price data, i.e., the constraint prices for a transmission element during an outage, and making accessible electronically the outage historical constraint price data for the one transmission element or group of transmission elements. In one embodiment, a correlation engine may be made accessible to selected users on a password-controlled website to perform the correlation operation to obtain outage and historical constraint price data. The correlation algorithm used is not limiting on the invention.

In a further embodiment, a computer-implemented operation is provided of sending electronically to one or more electronic addressees buy or sell offers based on binding constraints for one or more periods of time for one or more transmission elements and/or groups of transmission elements.

In a further embodiment, a computer-implemented operation is provided of calculating a bid and/or an ask for the constraint price data on the transmission element or group of transmission elements for a selected period of time, and making accessible electronically the bid and/or an ask for the constraint price data on the transmission element or group of transmission elements for the selected period of time. To name just one example, the bid or ask price may be calculated by first determining or obtaining data on the volatility of the constraint prices in the historical data, and/or obtaining forward-looking data on upcoming events, such as a known power outage (including planned out-of-service periods) on a transmission element or group of transmission elements, or a weather forecast for 100 degree F. temperature conditions forecast for the month of July. By way of example, the historical constraint prices could be obtained for one or more transmission elements or groups of transmission elements that coincided with a transmission element outage or a weather event. The outage or weather event constraint price data could then be used through volatility or mean analysis, for example, to set the bid or the ask price for the transmission element or group of transmission elements for the selected period of time.

In a further embodiment, a computer-implemented operation is provided of calculating an option price for a strike price on a selected one of the transmission elements or one of the groups of transmission elements for a particular period of time, and making accessible electronically the option price on the selected transmission element or group of transmission elements for the particular period of time. Note that a strike price comprises the sum of one or more constraint prices for the time period for the transmission element or group of transmission elements, and might be used as a stop-loss measure in a severely constrained situation. A range of strike prices may be determined based at least in part on the historical constraint price data, the volatility of the constraint price data, and forward-looking events such as scheduled transmission element outages or weather events, as discussed above. For example, if a trader expects the value of a binding constraint to be plus $1000 for a given transmission element for the month of July, the trader may wish to also purchase an option to purchase the binding constraint at plus or minus $1100, to create a stop-loss at $100. By way of example, if the constraint of interest was $1000, then the trader would only exercise this option only if the constraint price for the month of July was greater than $1100. Note that the constraint may be a plus or a minus depending on the direction of interest. For example, there may be a constraint of plus $1000 for a power transmission from A to B. Alternatively, there would be a constraint of minus $1000 for a transmission from B to A. Although not limiting on the invention, to name just one example, the option price may be calculated by a mean-reverting option pricing algorithm.

In a further embodiment, a computer-implemented operation is provided of obtaining a weather forecast for one or more of the time increments in the future that forecasts a particular weather pattern, obtaining electronically historical weather data that identifies weather patterns, selecting historical constraint price data for that one transmission element or group of transmission elements for time increments that are coincident with the occurrence of the weather pattern as determined from the historical weather data to obtain weather correlated historical constraint price data, calculating a constraint price based on the weather correlated historical constraint price data for one or more of the time increments in the future for the transmission element or groups of transmission elements, and making accessible electronically the constraint price.

Figure 2:
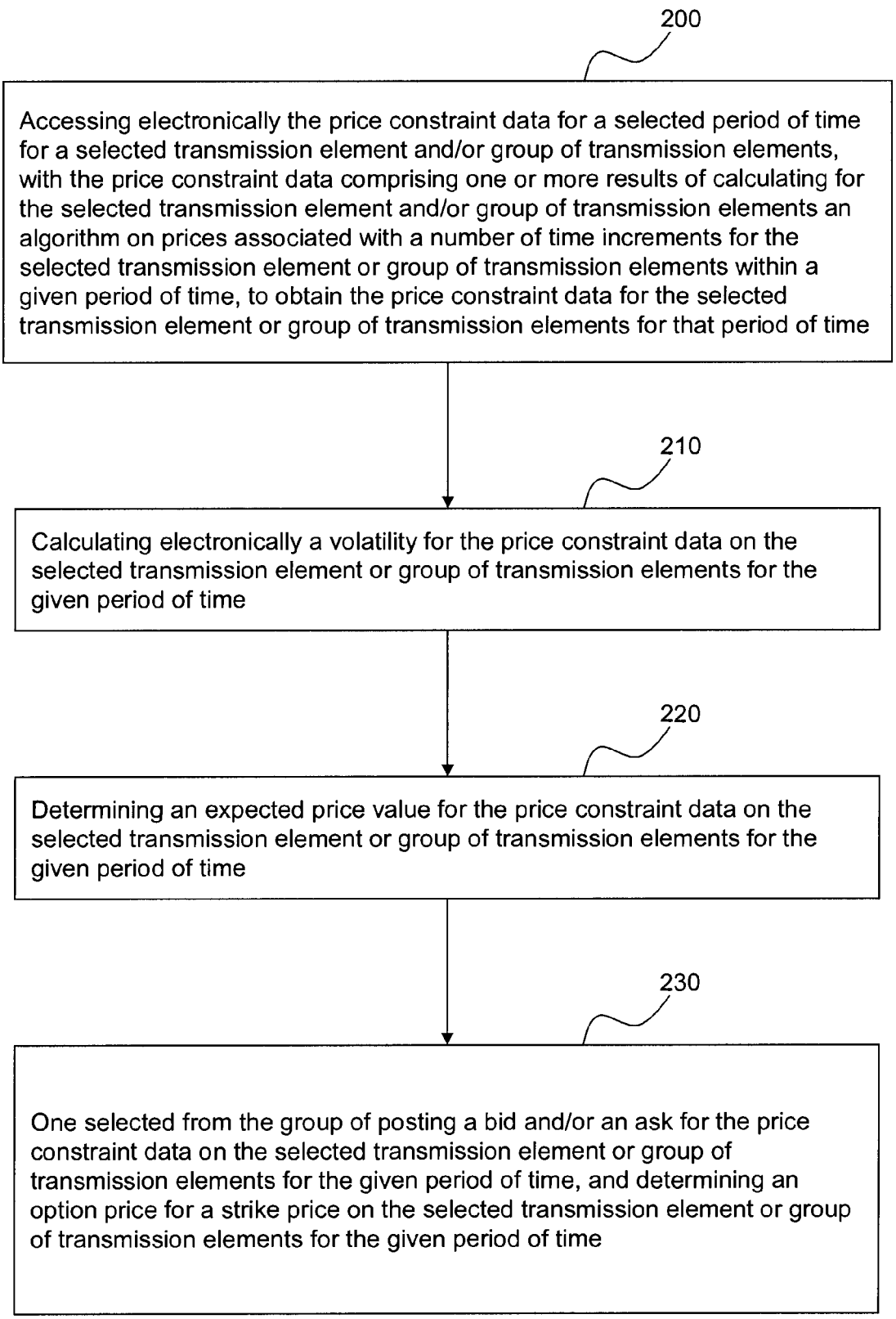
FIG. 2 is a flowchart for a further embodiment of the invention.

FIG. 2 represents the system operations, program product code and method steps for a further embodiment of the invention for facilitating trading derivatives of energy binding constraints. Block 200 comprises the computer-implemented operation of accessing electronically constraint price data for a selected period of time for a selected transmission element and/or group of transmission elements, with the constraint price data comprising one or more results calculated for the selected transmission element and/or group of transmission elements an algorithm on prices associated with a number of time increments for the selected transmission element or group of transmission elements within a given period of time, to obtain the constraint price data for the selected transmission element or group of transmission elements for that period of time. The algorithm used in the calculation may be the same as for the operation 110 in FIG. 1, e.g., a summing algorithm, an averaging algorithm, calculating a standard deviation algorithm, and calculating a median algorithm, to name a few.

Block 210 comprises the computer-implemented operation of calculating electronically a volatility for the constraint price data on the selected transmission element or group of transmission elements for the given period of time. As noted above, the volatility of the constraint prices in the historical data may be determined by applying a mean reverting or other algorithm. Additionally, volatility may be determined by obtaining forward-looking data on upcoming events, such as, for example, a known outage (including planned out-of-service periods) on a transmission element or group of transmission elements, or a weather forecast, e.g., 100 degree F. temperature condition days forecast for the month of July. By way of example, the historical constraint prices could be obtained for one or more transmission elements or groups of transmission elements that coincided with a transmission element outage or a weather event. In one embodiment this correlation could comprise a computer-implemented operation of obtaining electronically for one of the transmission elements or one of the groups of transmission elements historical outage data including a date or time, correlating the historical constraint price data for that one transmission element or group of transmission elements with one or more outages in the historical outage data for that one transmission element or group of transmission elements to obtain outage historical constraint price data, i.e., the constraint prices for a transmission element during an outage.

Block 220 comprises the computer-implemented operation of determining an expected price value for the constraint price data on the selected transmission element or group of transmission elements for the given period of time based on the historical constraint prices and the volatility data. This expected price value can be calculated through mean, volatility or other mathematical analysis on the time increment price constraint data, e.g., the hourly price constraint data.

Block 230 comprises the computer-implemented operation of performing one selected from the group of posting a bid and/or an ask for the constraint price data on the selected transmission element or group of transmission elements for the given period of time, and determining an option price for a strike price on the selected transmission element or group of transmission elements for the given period of time.

Figure 3:
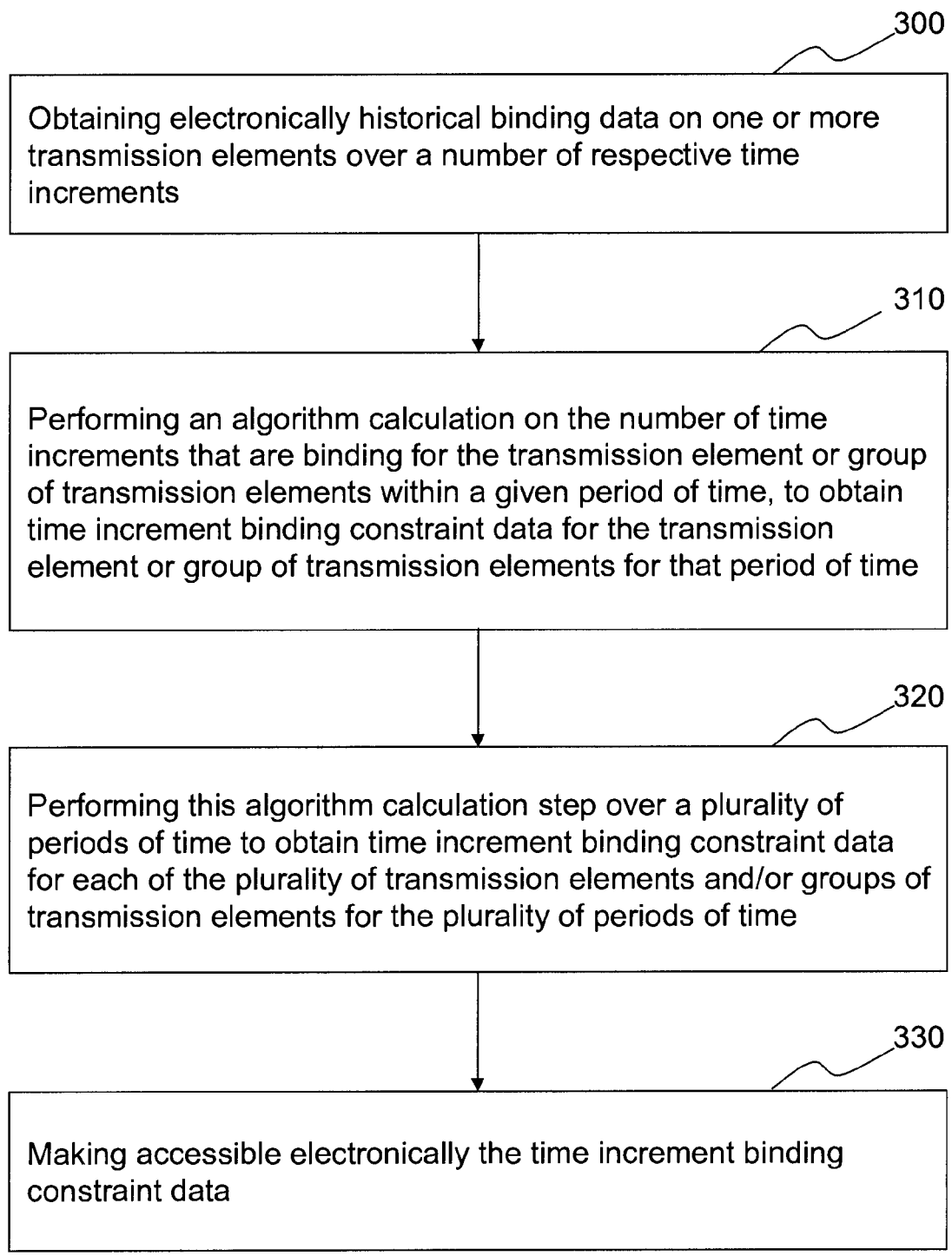
FIG. 3 is a flowchart for a yet further embodiment of the invention.

FIG. 3 represents the system operations, program product code and method steps for a further embodiment of the invention for facilitating trading derivatives of energy constraints. Block 300 comprises the computer-implemented operation of obtaining electronically historical binding data on one or more transmission elements or groups of transmission elements over a number of respective time increments. This historical binding data may comprise identified time increments, e.g., hours, during which there is a binding constraint on the transmission element or group of transmission elements. This binding data may be obtained by accessing an electronic database maintained by an Independent System Operator (ISO), Regional Transmission Organization (RTO) or other governmental or non-governmental organization. Alternatively, this binding data may be accessed from a publication and placed into electronic form. Note that the historical binding data may be received in sorted form, e.g., sorted by transmission element or groups of transmission elements. In the event the historical binding data is not received in sorted form, the historical binding data may be sorted by transmission element or groups of transmission elements.

Block 310 comprises the computer-implemented operation of performing an algorithm calculation on the number of time increments, e.g., hours, that are binding for the transmission element or group of transmission elements within a given period of time, to obtain time increment binding data, e.g., binding hours, for the transmission element or group of transmission elements for that period of time. The algorithm used in the calculation may be the same as for the operation 110 in FIG. 1, e.g., a summing algorithm, an averaging algorithm, a standard deviation calculating algorithm, and a median calculating algorithm, to name a few.

Block 320 comprises the computer-implemented operation of performing this algorithm calculation operation over a plurality of periods of time to obtain time increment binding data for each of the plurality of transmission elements and/or groups of transmission elements for the plurality of periods of time.

Block 330 comprises the computer-implemented operation of making accessible electronically the time increment binding data. The electronic accessibility may be obtained by posting the constraint price data on a secure password-controlled website, or posting via instant messaging to one or more electronic addressees, allowing a download of the binding data from the Internet, or may comprise sending electronically or by mail the constraint price data.

Figure 4:
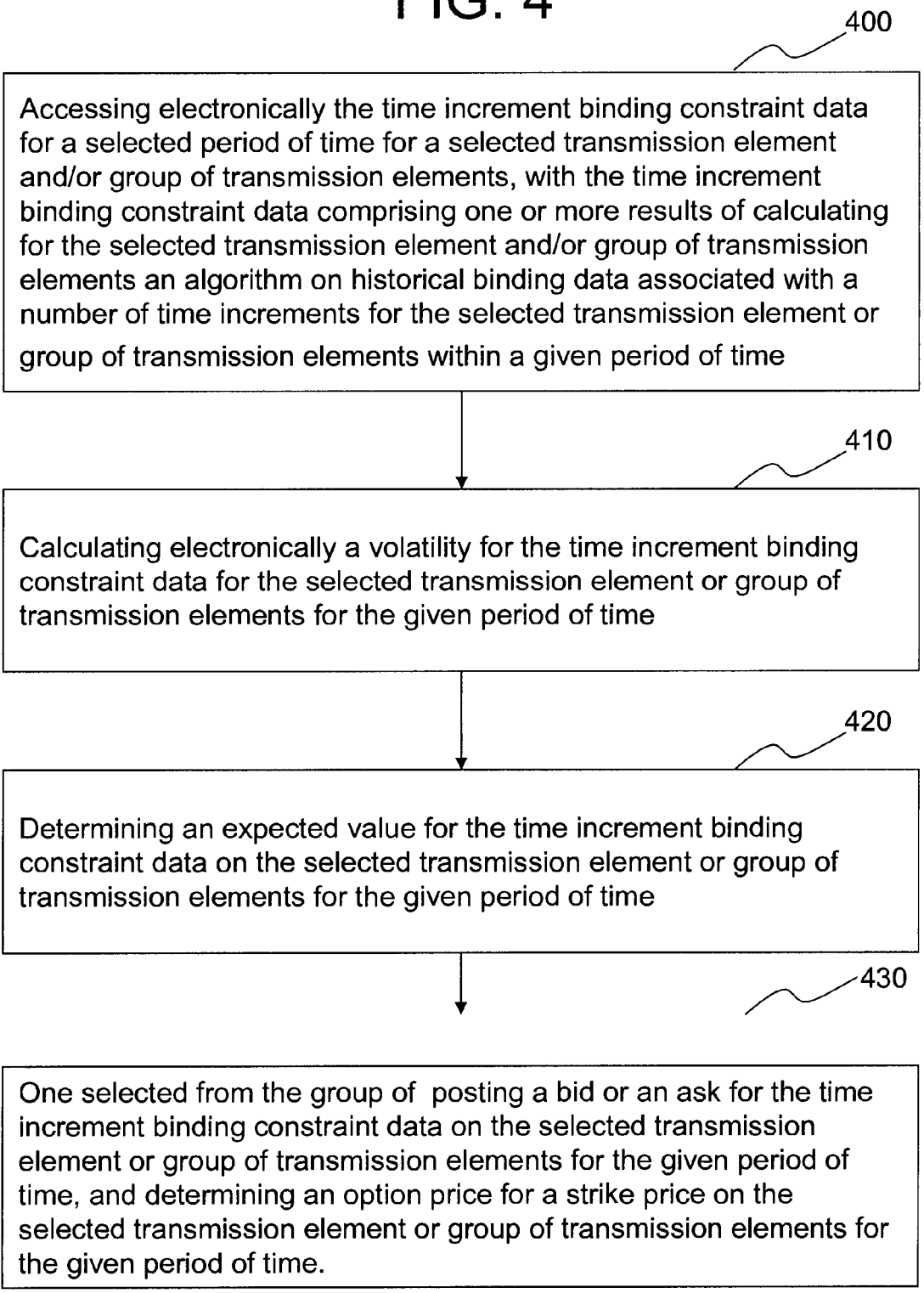
FIG. 4 is a flowchart for a yet further embodiment of the invention.

FIG. 4 represents the system operations, program product code and method steps for a further embodiment of the invention for facilitating trading derivatives of energy binding constraints. Block 400 comprises accessing electronically the time increment binding data, e.g., hours, for a selected period of time for a selected transmission element and/or group of transmission elements, with the time increment binding data comprising one or more results calculated for the selected transmission element and/or group of transmission elements an algorithm on the historical binding data associated with a number of time increments for the selected transmission element or group of transmission elements within a given period of time. The algorithm used in the calculation may be the same as for the operation 110 in FIG. 1, e.g., a summing algorithm, an averaging algorithm, calculating a standard deviation algorithm, and calculating a median algorithm, to name a few. Thus, as an example, for the period of time of July, the time increment binding data might be 100 hours, representing 100 hours for the selected transmission element or group of transmission elements that are constrained.

Block 410 comprises the computer-implemented operation of calculating electronically a volatility for the time increment binding data for the selected transmission element or group of transmission elements for the given period of time. As noted above, the volatility of the time increment binding data in the historical data may be determined using a mean reverting or other algorithm. Additionally, volatility may be determined by obtaining forward-looking data on upcoming events, such as, for example, a known power outage (including planned out-of-service periods) on a transmission element or group of transmission elements, or a weather forecast, e.g., 100 degree F. temperature condition days forecast for the month of July. By way of example, the historical time increment binding data could be obtained for one or more transmission elements or groups of transmission elements that coincided with a transmission element outage or a weather event. In one embodiment this correlation could comprise the operation of obtaining electronically for one of the transmission elements or one of the groups of transmission elements historical outage data including a date or time, correlating the historical time increment binding data for that one transmission element or group of transmission elements with one or more outages in the historical outage data for that one transmission element or group of transmission elements to obtain outage historical time increment binding data, e.g., the number of binding hours for a transmission element during an outage. Additionally, this volatility determination may take into account forward looking events that have no history. For example, a transmission upgrade or plant upgrade that is believed, modeled, or known to relieve congestion in other areas but has not been in place long enough to have experienced a 100-degree day. The forward looking volatility could be based on derivative or mathematical models that estimate volatility or through applying volatility adjustments to historical volatility based on historical events that are similar to the forward looking event.

Block 420 comprises the computer-implemented operation of determining an expected value for the time increment binding data on the selected transmission element or group of transmission elements for the given period of time. This expected value can be calculated through mean, volatility or other mathematical analysis on the time increment binding data, e.g., the binding hours data for the selected transmission element or group of elements for a given time period.

Block 430 comprises the computer-implemented operation selected from the group of posting a bid and/or an ask for the time increment binding data on the selected transmission element or group of transmission elements for the given period of time, and determining an option price for a strike price on the selected transmission element or group of transmission elements for the given period of time. Note that a market maker could come in on either side or post both a bid and an ask. For example, if the market maker estimated that a price constraint was worth $1000, it could post a bid at $900 and an ask at $1100, to keep the market liquid.

A further embodiment comprises the operation of calculating prices for calls and puts on these swaps.

A further embodiment comprises the operation of setting a cap on a total payout for the derivative.

A further embodiment comprises the operation of selling the derivative instruments in strips (for example weekends, onpeak or offpeak).

A further embodiment comprises the operation of trading or facilitating the trading of the derivative on an exchange or over the counter.

In a yet further embodiment, a derivative may be formed around a load (or demand) on an electric transmission system by a region. Such data is posted by the ISOs or RTOs and may be posted by other organizations in the future. Changes in load lead to changes in electricity prices and congestion prices in the Day Ahead, Hour Ahead and Real Time markets, to name a few. The derivative would comprise, in a further embodiment, a swap around a contract number representing electrical load, e.g., megawatt-hours (MWH), gigawatt-hours, or other denomination, per period of time. For example, if a load is typically 3.5 million MWH in July, the contract may trade around 3.5 million MWH. One party would pay the other for every MWH that the load exceeded 3.5 million MWH during the month of July. Another party would pay for every MWH that the load fell short of 3.5 million MWH during the month of July.

As noted, electrical load is reported by the ISO's and is publicly available. An algorithm may be applied to the MWH for each zone (or sub-zone or set of zones) as reported by the ISO to thereby value the derivative. The derivative could settle on the forward looking ISO projected load, the DA (Day-ahead) modeled load or the real time reported load, for example.

Figure 5:
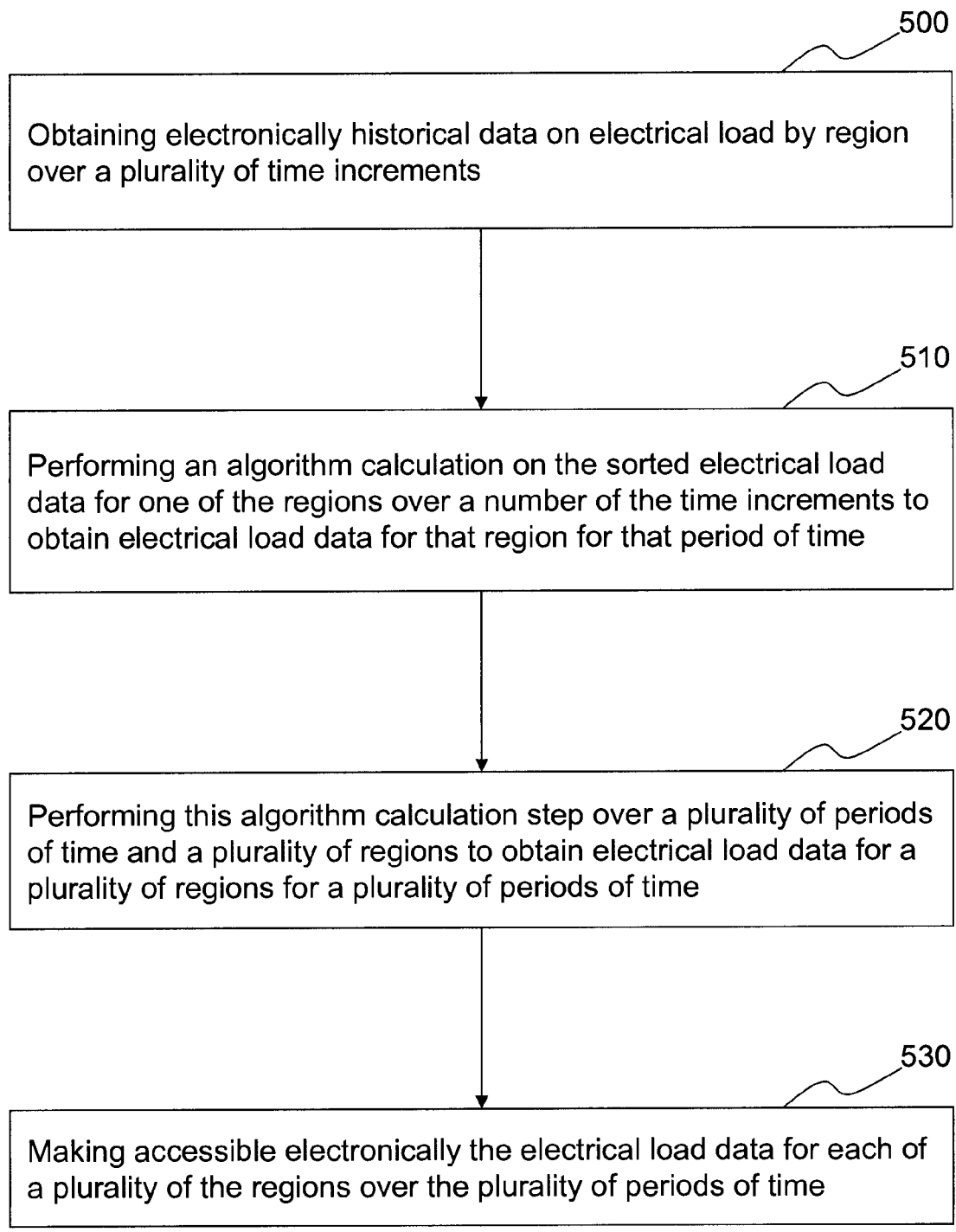
FIG. 5 is a flowchart for a yet further embodiment of the invention.

Referring now to FIG. 5, this figure represents the system operations, program product code and method steps for a load derivative embodiment of the invention. Block 500 comprises a computer-implemented operation of obtaining electronically historical data on electrical load by region over a plurality of time increments. As noted above, this historical electrical load data may be obtained by accessing an electronic database maintained by an Independent System Operator (ISO), Regional Transmission Organization (RTO) or other governmental or non-governmental organization. Alternatively, this historical load data may be accessed from a publication and placed into electronic form. The electrical load data may be received sorted by region. Alternatively, a sorting operation by region may be performed.

Block 510 comprises an operation of performing an algorithm calculation on the sorted electrical load data for one of the regions over a number of the time increments to obtain electrical load data for that region for that period of time. The algorithm used in the calculation may be a summing algorithm, an averaging algorithm, a standard deviation calculating algorithm, and a median calculating algorithm, to name a few.

Block 520 comprises a computer-implemented operation of performing this algorithm calculation step for a plurality of periods of time and a plurality of regions to obtain electrical load data for a plurality of regions for a plurality of periods of time.

Block 530 comprises a computer-implemented operation of making accessible electronically the electrical load data for each of a plurality of the regions over the plurality of periods of time. The electronic accessibility may be obtained by posting the electrical load data on a secure password-controlled website, or posting via instant messaging to one or more electronic addressees, allowing a download of the electrical load data by region by period of time from the Internet, or may comprise sending electronically or by mail the electrical load data.

Figure 6:
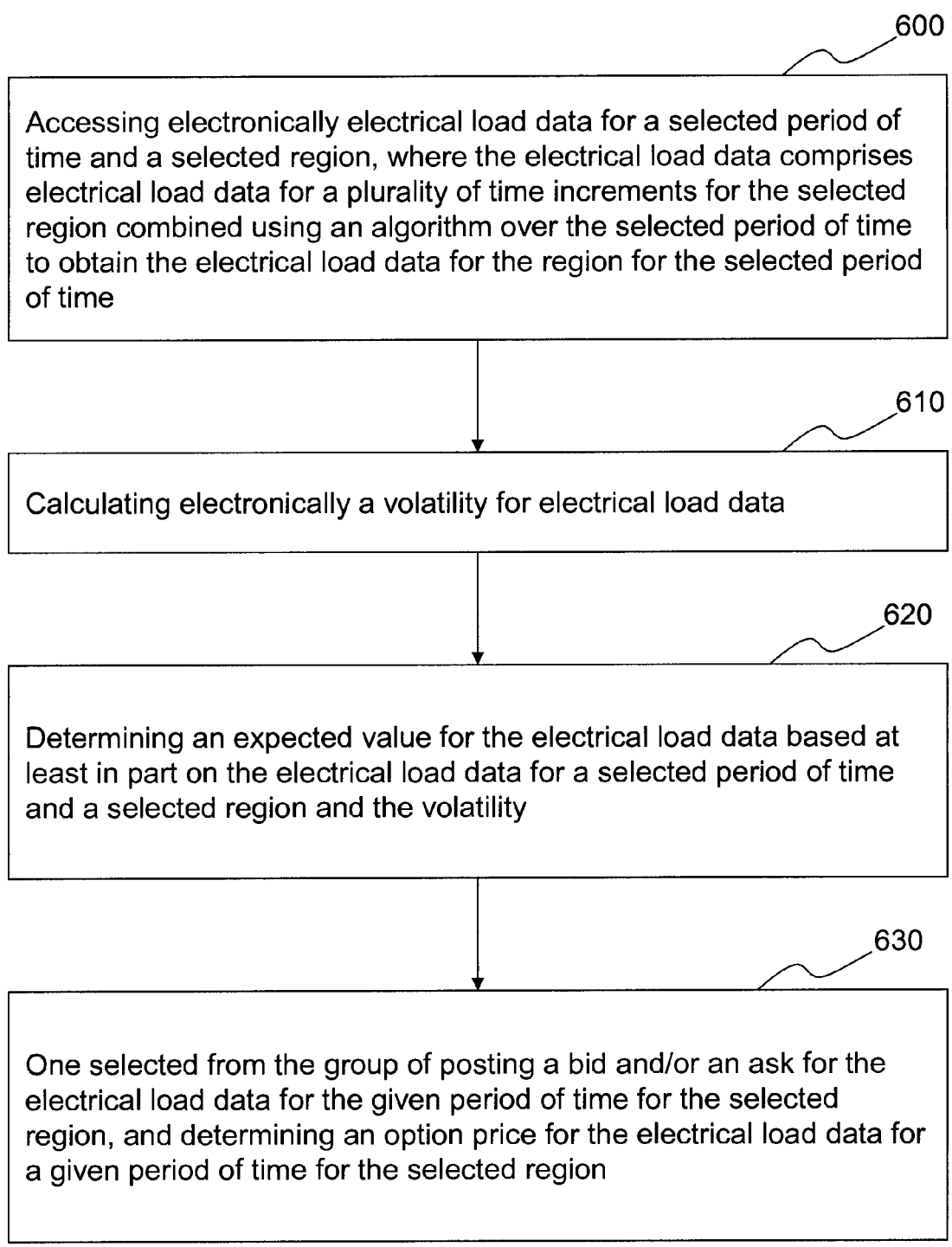
FIG. 6 is a flowchart for a yet further embodiment of the invention.

FIG. 6 represents the system operations, program product code and method steps for a further embodiment of the invention for facilitating trading derivatives of electrical load. Block 600 comprises a computer-implemented operation of accessing electronically electrical load data for a selected period of time and a selected region, where the electrical load data comprises electrical load data for a plurality of time increments for the selected region combined using an algorithm over the selected period of time to obtain the electrical load data for the region for the selected period of time. The algorithm used in the calculation may be a summing algorithm, an averaging algorithm, a standard deviation calculating algorithm, and a median calculating algorithm, to name a few.

Block 610 comprises a computer-implemented operation of calculating electronically a volatility for electrical load data. As noted above, the volatility of the historical load data may be determined using the following mean reverting or other algorithms. Additionally, volatility may be determined by obtaining forward-looking data on upcoming events, such as a known power outage (including planned out-of-service periods) on a transmission element or group of transmission elements, or a weather forecast, e.g., 100 degree F. temperature condition days forecast for the month of July. By way of example, the historical load data could be obtained for a region that coincided with a weather event or seasonal weather patterns in that region. In one embodiment this correlation could comprise the operation of obtaining electronically for one of the region's historical weather data, correlating the historical load data for that one region with the weather data, e.g., the load in MWH for a region during a weather pattern or season.

Block 620 comprises a computer-implemented operation of determining an expected value for the electrical load data based at least in part on the electrical load data for a selected period of time and a selected region and the volatility. For example, the method could look at seasonal historical load data that is most relevant, obtain an average or median load per time increment, and multiply by the number of time increments, e.g., hours, in the period of time of interest. The period of time is not limiting on the invention, and might be for example, on-peak, off-peak, super-peak, day, weekend, to name a few.

Block 630 comprises the operation selected from the group of posting a bid and/or an ask for the electrical load data for the given period of time for the selected region, and determining an option price for the electrical load data for a given period of time for the selected region.

A further embodiment comprises the operation of calculating prices for calls and puts on these swaps.

A further embodiment comprises the operation of setting a cap on a total payout for the derivative.

A further embodiment comprises the operation of selling the derivative instruments in strips (for example weekends, onpeak or offpeak).

A further embodiment comprises the operation of trading or facilitating the trading of the derivative on an exchange or over the counter.

Figure 7:
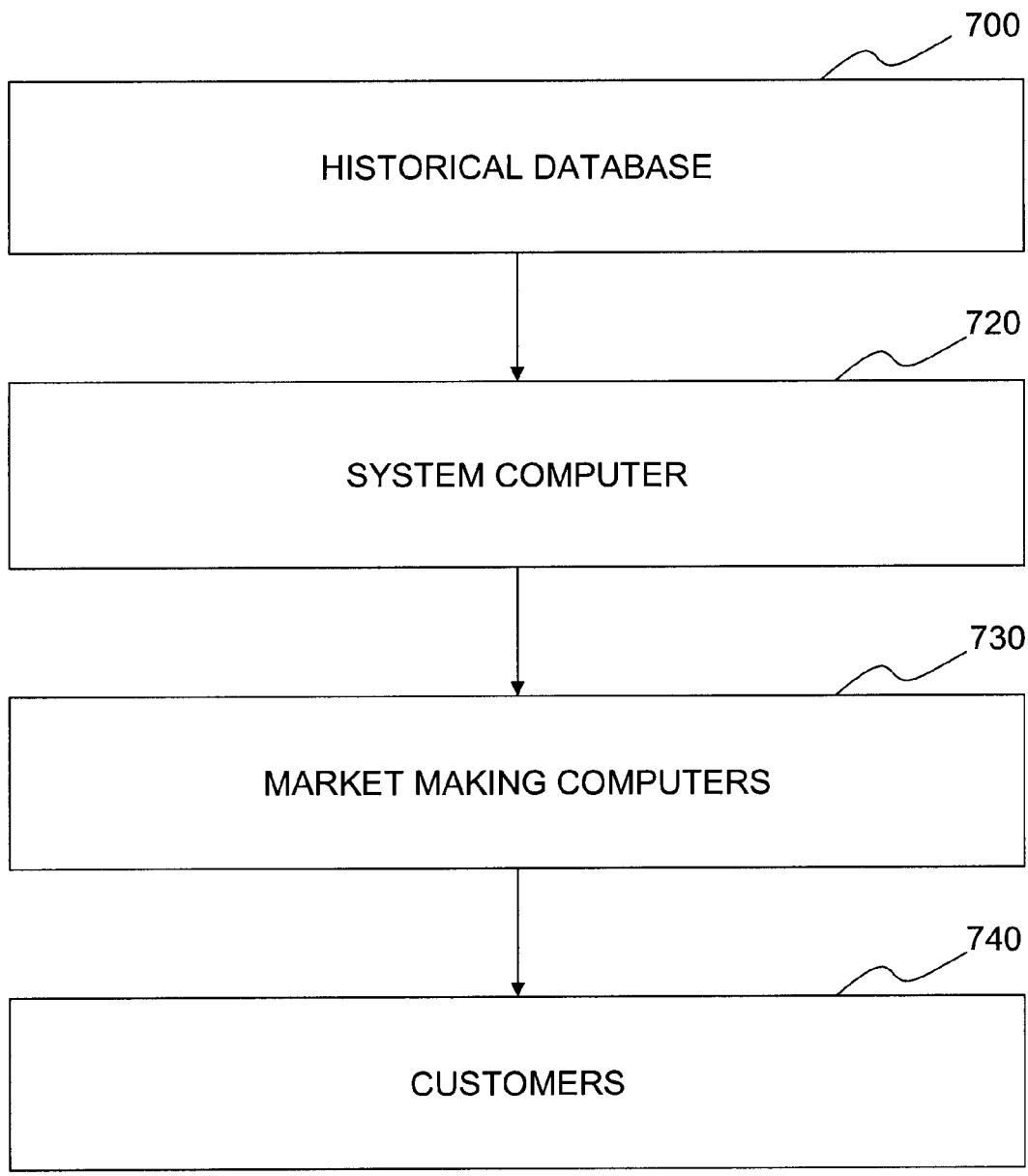
FIG. 7 is a schematic block diagram of an implementation of the invention.

FIG. 7 is a schematic block diagram of one embodiment of an overall context for the present system. Block 700 comprises a historical binding constraint database, that may list the binding hours, and or constraint prices, and/or outages (planned or unplanned) for a plurality of transmission elements and/or groups of transmission elements by time increment, e.g., hours. The database 700 may in addition or alternatively include hourly load data by region, sub-region or groups of regions and sub-regions. The data may have been acquired from one or more ISOs, RTOs and other organizations. Sorting functions and normalization functions may have been performed on the data to improve accessibility and utility. Block 720 comprises a system computer 720 for performing the operations as described herein. Block 730 comprises a computer for a market making operation that retrieves data from the system computer of block 720 and uses the data to perform one or more trading functions with derivatives generated based on the constraint prices, binding hours, and/or load data. Block 740 represents client computers of customers.

In certain embodiments, execution of one or more steps may be automated on a computer system, which can be, for example, a mainframe computer, minicomputer, workstation, personal computer, a web computer, a thin client, and an Internet appliance. The embodiments of the present invention may comprise a special purpose or general-purpose computer including various computer hardware, the execution unit portion of which may also be known herein as a "processor."

Figure 8:
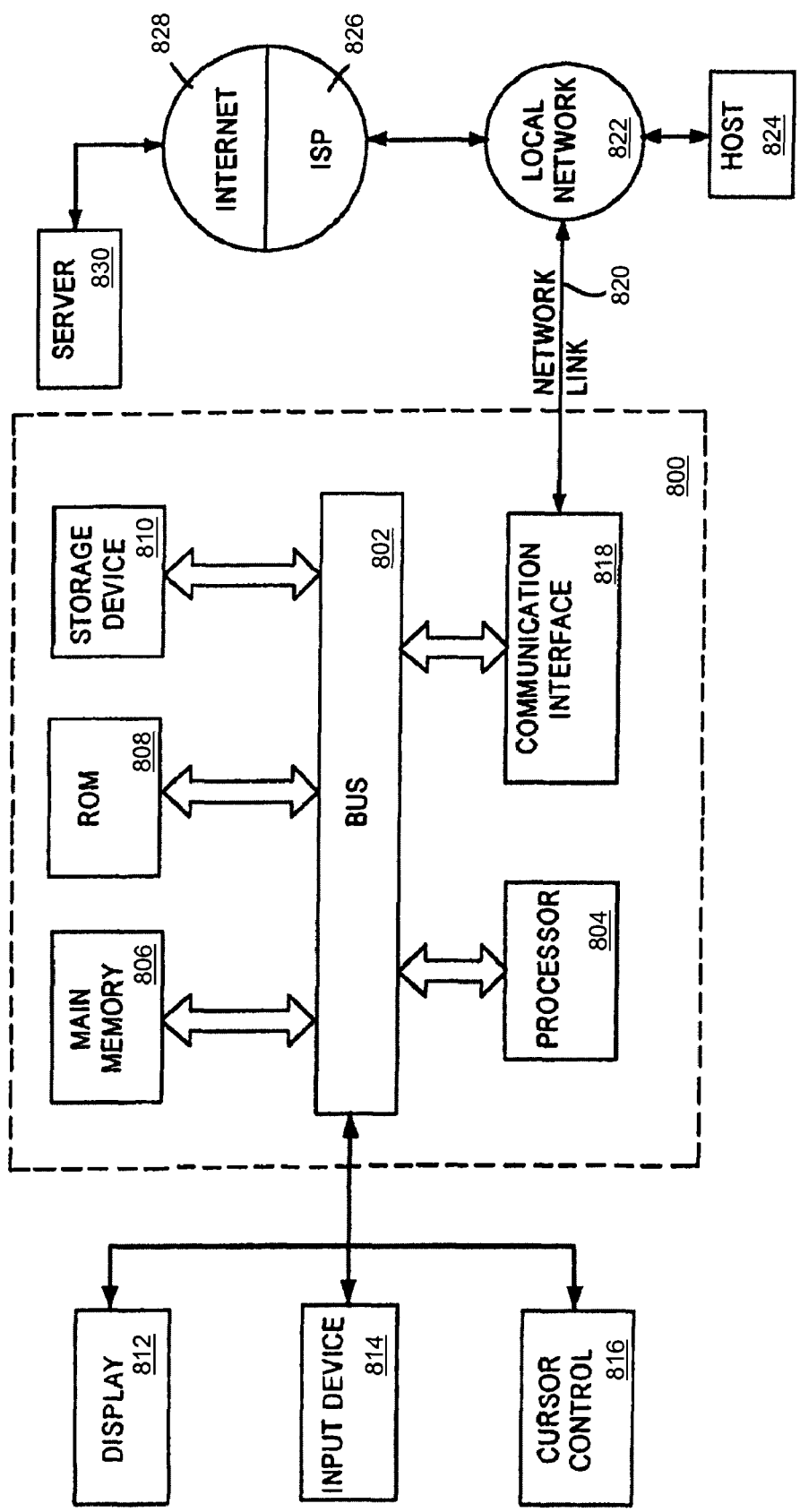
FIG. 8 is a schematic block diagram of an implementation of the invention.

FIG. 8 is a block diagram that illustrates an example a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions by processor 804. Computer system 800 further includes a read only memory (ROM) 808 or other static storage device coupled to the bus 802 for storing static information and instructions for processor 804. A storage device 810, such as a magnetic disk or optical disk, is provided and coupled to the bus 802 for storing information and instructions.

Computer system 800 may be coupled via the bus 802 to a display 812, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812.

One embodiment of the invention is related to the use of computer system 800 for the processing as described. Processor 804 executes one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

Those skilled in the art will appreciate that the invention may be practiced in network computing environments with many types of computer system configurations, including personal computers, hand-held devices, mobile telephones, multi-processor systems, microprocessor-based or programmable consumer electronics, network PCs, minicomputers, mainframe computers, to name a few. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

In a networked environment, the computer may operate using logical connections to one or more other computers having processors. Logical connections may include a local area network (LAN) and a wide area network (WAN) that are presented here by way of example and not limitation. Such networking environments are commonplace in office-wide or enterprise-wide computer networks, intranets (a network belonging to an organization, usually a corporation, accessible only by the organization's members, employees, or others with authorization).

To facilitate this communication, computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Accordingly, network link 820 may provide the capability for data communication through one or more networks to other data devices. For example, network link 820 may provide a connection through network 822 to one or more host computers 824 or to data equipment operated by an Internet Service Provider (ISP) 826. ISP 826 in turn provides data communication services through the worldwide packet data communication network, now commonly referred to as the "Internet" 828. Local network 822 and Internet 828 both use electrical, electromagnetic or optical signals that carry digital data streams. The type of network link is not limiting on the invention.

Computer system 800 can send messages and receive data, including program code, through the network(s), network link 820, and communication interface 818. If the Internet is used, access to a remote computer server 830 might be obtained to receive constraint data or to have calculations performed for an application program through Internet 828, ISP 826, local network 822 and communication interface 818. The received data and code may be processed by processor 804 as it is received, and/or stored in storage device 810, or other non-volatile storage for later execution.

Embodiments within the scope of the present invention also include computer-readable media for carrying or having computer-executable instructions or data structures stored thereon, also known as software. Such computer-readable media can be any available media, which can be accessed and read by a general purpose or special purpose computer. By way of example, and not limitation, such computer-readable media can comprise RAM, ROM, EPROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. Computer-executable instructions comprise, for example, instructions and data which configure a general purpose computer, special purpose computer, or special purpose processing device to perform a certain function or group of functions. Computer-executable instructions may also be properly termed "software" as known by those of skill in the art.

Program code or software comprising one or more program modules may be stored on the hard disk, magnetic disk, optical disk, ROM or RAM, and may include an operating system, one or more application or software programs, other program modules, and program data. In some embodiments, the program(s) may be deployed and accessible on the Internet and operate within Web browsers.

Figure 9:
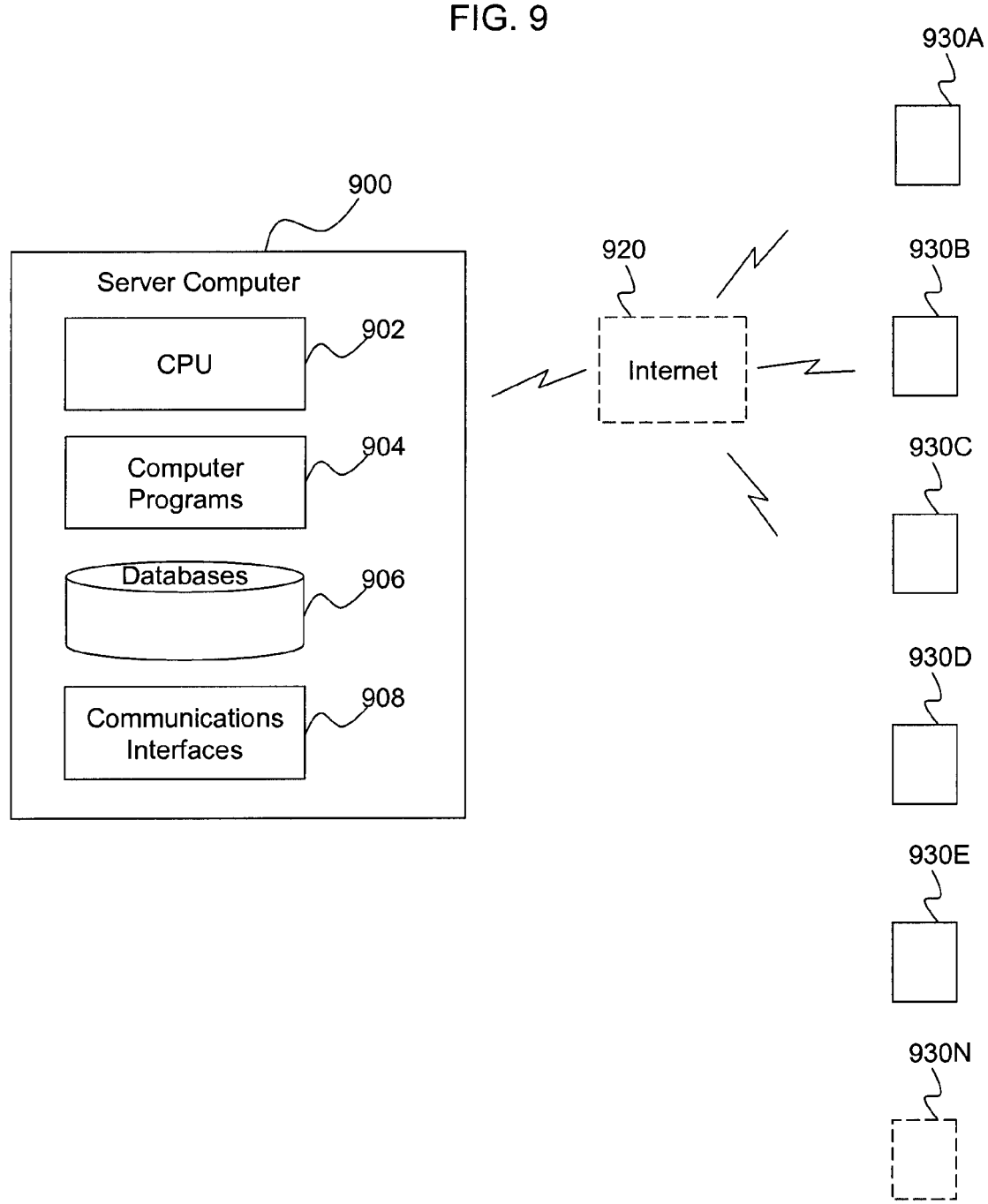
FIG. 9 is a schematic block diagram of an implementation of the invention.

FIG. 9 discloses a further embodiment, comprising a trading service which may be offered to traders. In an example framework, a service provider offers a trading service to a plurality of trader clients (e.g., client 930A, client 930B, . . . , client 930N) from a server computer 900 via a network 920. The trading service may be offered through a server application running on the server computer 900, and the trading service may be offered in accordance with one or more trading methods consistent with what is described.

The server computer 900 may comprise, in one embodiment, one or more CPU's or processors 902, various trading programs 904, one or more databases, 906, and one or more communication interfaces 908. The server computer 900 may be also comprised of various amounts of RAM storing computer programs and other data, and other components typically found in computers. In addition, the server computer 900 may include one or more monitors, and fixed or removable data storage devices such as hard disk drives, floppy disk drives, and/or CD-ROM drives. Also, input devices, such as mouse pointing devices and keyboards, may be included. The server computer 900 operates under the control of an operating system to execute the programs 904. Note that in alternative embodiments, some of these computer programs 904 may be executed on the client computers 930 of the respective traders.

The network 920 may represent a generic network, which may correspond to a local area network (LAN), a wide area network (WAN), the Internet, a proprietary network, a telephone network, a wireless network, or a combination of networks. Depending on the nature of the network employed for a particular application, the network 920 may be implemented accordingly. The network 920 serves the purpose of delivering information between connected parties.

In one embodiment, the server computer 900 may interact with the trader clients 930, and power industry databases, through an online web site supported by a web server. The server computer 900 may include the trading service application as described, comprising a sequence of programmed instructions which, upon execution, are operable to configure a computer system 900 to carry out the client power derivatives trading operations described herein. The trading service application may also include sequences of database access instructions, such as scripts, to effect storage and retrieval of data from the database 906. These database access scripts may be implemented, in one embodiment, in the form of SQL scripts.

The server computer 900 also includes a communication interface 908 coupled to the bus in the system. The communication interface 908 may provide a two-way or multi-way data communication coupling to the network 920. For example, the communication interface 908 may be a modem or an Integrated Services Digital Network (ISDN) card to provide a data communication connection to a corresponding type of telephone line. As another example, the communication interface 908 may be a LAN card to provide a data communication connection to a compatible LAN. Wireless links may also be implemented. In any such implementations, the communication interface 908 sends and receives electrical, electromagnetic, or optical signals that carry digital data streams representing various types of information. As another example, the communications interface 908 may include an Ethernet interface or a LAN communication card, a dial-up modem interface using the PSTN, an intranet, or any combination thereof.

In an embodiment, the server computer 900 may be configured to generate and output interactive pages to a trader client using the World Wide Web, suitable for display using a web browser. Accordingly, the server computer 900 may generate and transmit the requested information to the requesting trader via Hypertext Transfer Markup Language (HTML) formatted or eXtensible Markup Language (XML) formatted pages, which may be provided as World Wide Web pages, using the network 920. As described previously, the network 920 may be, for example, a network of interconnected networks such as the Internet, a LAN, a WAN, an intranet including any of these, and/or a PSTN. In one embodiment, the server computer 900 may include a secure web application server, behind the server application, for executing the web based application programs. Thus, interactive pages transmitted and received using the network 920 may conform to the Secure Socket Layer and/or other security protocols.

The communications interface 908 may further include a web browser to allow navigation via hyperlinks. The web browser may use a protocol such as, for example, HyperText Transfer Protocol (HTTP) or File Transfer Protocol (FTP), to transmit data of various content such as, for example, the aforementioned HTML formatted documents, plain text documents, graphic images, and XML documents for presentation to the user via the display 1425. Web pages formatted in accordance with HTML or XML may be provided in accordance with the eXtensible Style Language (XSL) specification available from the World Wide Web Consortium. The web browser may also run or execute programs, such as Java applets including sequences of instructions provided in accordance with the Java programming language, or JavaScript.

Figure 10:
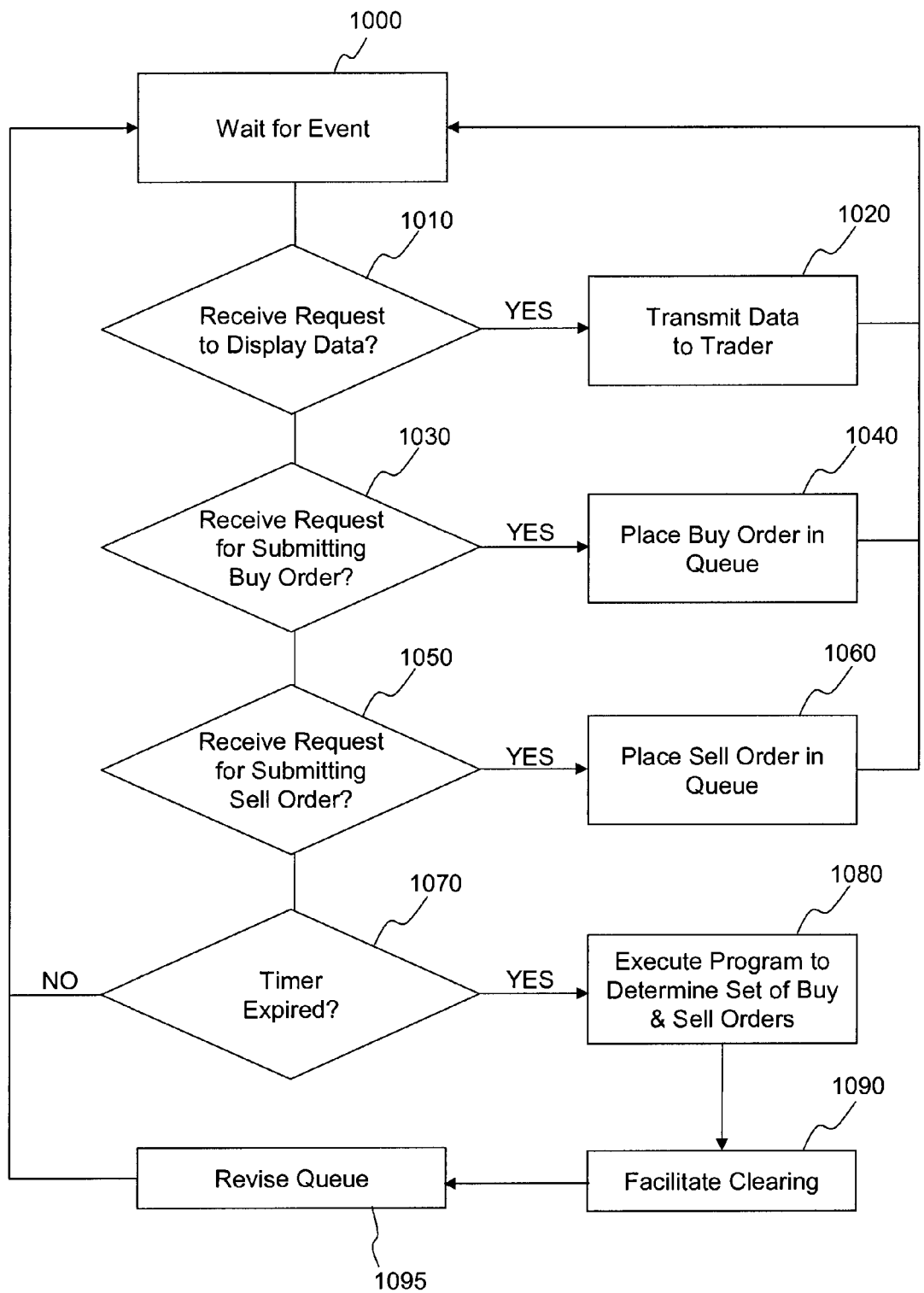
FIG. 10 is a schematic block diagram of an implementation of the invention.

Referring to FIG. 10, an embodiment of the computer-implemented operations to implement a power derivatives trading exchange is shown. Block 1000 comprises the server computer 900 waiting to receive data that the next event has occurred. Block 1010 is a decision block that represents the server computer 900 determining whether it received a request to display data, from one of the trader client computers 930, to display data on power derivative instruments available for sale, including price data and quantity data. If so, block 1020 represents the server computer 14 transmitting data to the respective client computer 930 for subsequent display. The data transmitted for display preferably includes at least three types of data: the current list of trading derivative financial instruments, and price and quantity data.

Block 1030 is a decision block that represents the server computer 900 determining whether it received a request to submit a buy order from a trader client computer 930 for a particular derivative financial instrument. If so, block 1040 represents the server computer 900 processing the buy order by placing it in a queue in the memory of the server computer 900. In one embodiment, the buyer order would be ordered in the list of buy orders for derivative financial instruments by price. The buy order may have a data structure comprising:
  trader's account number;
  trader's name; the time and date of the order;
  the power derivative to buy; and
  a text-field where the trader may enter the total number to buy and the price.

Block 1050 is a decision block that represents the server computer 900 determining whether it received a request to submit a sell order from a trader client computer 930. If so, block 1060 represents the server computer 900 processing the sell order by placing it in a queue in the memory of the server computer 900. In one embodiment, the sell order would be ordered in the list of sell orders for derivative financial instruments by price. The sell order may have a data structure comprising:
  trader's account number;
  trader's name; the time and date of the order;
  the power derivative to sell; and
  a text-field where the trader may enter the total number to sell and the price.

The buy orders and the sell orders wait in the queue for the expiration of the predetermined timing cycle. The market price at which the trader actually sells the derivative financial instrument is determined by a price determining and quantity determining algorithm to be discussed below, for the power derivative financial instrument, at the end of the pricing cycle. The market price is set by the pricing/trading program executed by the server computer 900. The trader's account is then credited with the price determined for the power derivative instrument sale transaction.

Block 1070 is a decision block that represents the server computer 900 determining whether an internal timer for the pricing cycle has expired. If so, block 1080 represents the server computer 900 executing the pricing/trading program as described in FIG. 11. After execution of the pricing/trading program, a clearing operation 1090 is facilitated. This operation will be discussed below. Then in block 1095, the queue(s) of buy orders and the queue of sell orders are revised to delete those orders that has been consummated in the clearing operation, and to remove those orders that have expired.

Referring to FIG. 11, an embodiment of the invention is shown. Block 1100 comprises a computer implemented operation of determining which power derivatives to post on the electronic exchange based on one or more first criteria. One first criterion would comprise whether on not a given derivative will be in demand, e.g., generate enough interest that it will be liquid, so that it can be converted to cash without any significant loss of value.

In one embodiment, the system may rely on any or all of the following factors, to name a few, in selecting or determining which power derivatives to post on the trading exchange based on liquidity:

1. The quantity of hours binding;
2. The constraint price at which the constraint binds;
3. Whether the constraint binds on-peak, off-peak or twenty four hours;
4. The system database of historical outages;
5. The system database of projected outages.

In one embodiment, a power constraint derivative may be selected, automatically, for posting if one or more criteria are determined to be met by the system based on review of current, projected future, and historical constraint data, such as a) The system determines that a threshold is met comprising the constraint binding "X" hours over "Y" length of time, the constraint derivative will be posted for trading;

b) The system determines that a threshold is met comprising the price for the binding constraint pierces $"Z"/hr, the constraint derivative will be posted for trading;

c) The system determines that a threshold is met comprising the trading system's historical database shows evidence of binding behavior in the past (even if the constraint is no longer binding), the constraint derivative may be posted for trading;

d) The system determines that a threshold is met comprising the Administrator's or system proprietary models show a propensity of a constraint likely to bind (an example being the Administrator's own dispatch modeling or powerflow modeling) even without historical or current evidence of binding, the constraint derivative may be posted for trading;

e) The system determines that a threshold is met comprising market participant interest of such a constraint (e.g., if Market Participant A or Market Participant B contact the administrator and request a certain constraint to be offered) the constraint may be posted for trading.

Note that some aspects of this determination may also be performed manually.

In addition, a 'synthetic' constraint may be created and posted for trading based on combinations of other constraints and combinations of the above factors. In one embodiment, two or more constraints may be combined based on one or more criteria, to create a multiple constraint power derivative. By way of example, information from the constraint databases, and knowledge, both of historical and projected constraints in the transmission grid may be used to select multiple constraints to form a single constraint derivative based on both constraints. For example, perhaps constraint A or B often bind in a certain location on the grid. Programming may be used to determine that a "derivative AB" should be marketed since it is more liquid than constraint derivative A or constraint derivative B would be on their own.

The threshold or criteria may be adjusted from time to time, based on factors, such as seasonal criteria, in determining the number of hours or sum of constraint prices necessary for a constraint to be considered liquid. The threshold could be adjusted based on how well derivatives have transacted during previous time periods during this season or based on current market dynamics. For example the threshold might be lowered to allow for additional derivatives to be posted if the system determines that all posted derivatives are proving to be highly liquid.

In another embodiment, the operation of block 1100 comprises obtaining such data from a third party calculation operation.

Block 1110 comprises a computer implemented operation of receiving electronically, by the one or more computers, a plurality of sell orders, with each respective sell order comprising respective constraint-based derivative sell price data and sell quantity data.

Block 1120 comprises a computer implemented operation of receiving electronically, by the one or more computers, a plurality of buy orders, with each respective buy order comprising respective constraint-based derivative buy price data and buy quantity data.

Block 1130 comprises a computer implemented operation of determining electronically, by the one or more computers, a respective set of one or more buy orders and one or more sell orders, based on one or more price criteria and/or one or more quantity criteria, to obtain a respective constraint-based derivative sale. For example, one buy order for a certain quantity could be matched with three sell orders. As another example, ten sell orders could be matched with 10 buy orders, with one buy order not necessarily matched to a given sell order. In one embodiment, an algorithm for matching buy and sell orders by price may be used.

In another embodiment, an algorithm may be used to set a price somewhere in between one or more buy prices and one or more sell prices, to try to obtain a price at which a willing sellers and a willing buyer would theoretically agree. For example, one way of determining this theoretical price is to stack sell orders by price (high to low or vice versa) and buy orders by price, and determine the price at which these orders cross. In this embodiment, each of a set of selected buyers would be matched to a set of selected sellers at this theoretical price, and a pro-rata quantity would be provided to each buyer in the set. In a further example, the clearing sell orders and buy orders may be determined by 1) aligning sell orders and buy orders where price and quantity match exactly; or 2) applying an algorithm that determines a market clearing price based on all sell orders and buy orders submitted and then awarding quantity accordingly; or 3) any other mechanism that aligns a seller with a buyer, or a set of buyers with a set of sellers.

Block 1140 comprises a computer implemented operation of facilitating clearing electronically, by the one or more computers, the respective power constraint-based derivative sale. In one embodiment, the actual clearing operation is performed by a third party clearinghouse, and the facilitating clearing electronically operation comprises transmitting or making accessible electronically, data on one or more buyers, one or more sellers, and respective quantities and respective prices, electronically associated with the respective one or more buyers and sellers, for the respective power constraint-based derivatives. In another embodiment, the facilitating clearing operation may comprise performing the actual clearing operation. The clearinghouse operation, in one example, would comprise managing cash and order credit flow between a buyer and a seller, or between a set of buyers and a set of sellers. For example, the clearinghouse would receive cash and/or a credit authorization from one or more buyers. The system then would facilitate transfer of ownership of one or more energy derivative instruments to the buyer, and would transfer cash and/or credit to one or more sellers.

Block 1150 comprises a computer implemented operation of transmitting electronically and/or making accessible electronically, by the one or more computers, data on the respective constraint-based derivative sale. By way of example, data on the respective constraint-based derivative sale may be transmitted electronically to the buyer and the seller, or made accessible on a web site accessed over an electronic network.

Those skilled in the art will recognize that the exemplary environment illustrated in the figures are not intended to limit the present invention. Indeed, those skilled in the art will recognize that other alternative hardware environments may be used without departing from the scope of the present invention.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and Web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system for facilitating trading derivatives of energy constraints, comprising:
   one or more computers, comprising memory, wherein the memory stores computer-readable instructions that, when executed, cause the one or more computers to perform the steps:
   obtaining electronically historical constraint price data on transmission elements or groups of transmission elements over a number of respective time increments;
   obtaining constraint price data for the one transmission element or group of transmission elements for the given period of time by performing an algorithm calculation on the constraint prices for one of the transmission elements or one of the groups of transmission elements over a number of time increments within a given period of time;
   obtaining constraint price data for each of the plurality of transmission elements or groups of transmission elements for the plurality of periods of time by performing this algorithm calculation step for a plurality of the periods of time;
   making accessible electronically the constraint price data;
   calculating a bid and/or an ask based at least in part on the constraint price data on the transmission element or group of transmission element for a selected period of time; and
   making accessible electronically the bid and/or an ask for the constraint price data on the transmission element or group of transmission elements for the selected period of time.

2. A system for facilitating trading derivatives of energy constraints, comprising:
   one or more computers, comprising memory, wherein the memory stores computer-readable instructions that, when executed, cause the one or more computers to perform the steps:
   obtaining electronically historical constraint price data on transmission elements or groups of transmission elements over a number of respective time increments;
   obtaining constraint price data for the one transmission element or group of transmission elements for the given period of time by performing an algorithm calculation on the constraint prices for one of the transmission elements or one of the groups of transmission elements over a number of time increments within a given period of time;
   obtaining constraint price data for each of the plurality of transmission elements or groups of transmission elements for the plurality of periods of time by performing this algorithm calculation step for a plurality of the periods of time;
   making accessible electronically the constraint price data;
   calculating an option price for a strike price on a selected one of the transmission elements or one of the groups of transmission elements for a particular period of time; and
   making accessible electronically the option price on the selected transmission element or group of transmission elements for the particular period of time.

3. A system for facilitating trading derivatives of energy constraints, comprising:
   one or more computers, comprising memory, wherein the memory stores computer-readable instructions that, when executed, cause the one or more computers to perform the steps:
   obtaining electronically historical constraint price data on transmission elements or groups of transmission elements over a number of respective time increments;

obtaining constraint price data for the one transmission element or group of transmission elements for the given period of time by performing an algorithm calculation on the constraint prices for one of the transmission elements or one of the groups of transmission elements over a number of time increments within a given period of time;

obtaining constraint price data for each of the plurality of transmission elements or groups of transmission elements for the plurality of periods of time by performing this algorithm calculation step for a plurality of the periods of time;

making accessible electronically the constraint price data; and determining a range of strike prices based at least in part on the constraint price data and volatility of the constraint price data; and making accessible electronically the bid and/or an ask for the constraint price data on the transmission element or group of transmission elements for the selected period of time.

4. A system for facilitating trading derivatives of energy constraints, comprising:

one or more computers, comprising memory, wherein the memory stores computer-readable instructions that, when executed, cause the one or more computers to perform the steps:

obtaining electronically historical constraint price data on transmission elements or groups of transmission elements over a number of respective time increments;

obtaining constraint price data for the one transmission element or group of transmission elements for the given period of time by performing an algorithm calculation on the constraint prices for one of the transmission elements or one of the groups of transmission elements over a number of time increments within a given period of time;

obtaining constraint price data for each of the plurality of transmission elements or groups of transmission elements for the plurality of periods of time by performing this algorithm calculation step for a plurality of the periods of time; and making accessible electronically the constraint price data;

obtaining a weather forecast for one or more of the time increments in the future that forecasts a particular weather pattern;

obtaining electronically historical weather data that identifies weather patterns;

obtaining weather correlated historical constraint price data by selecting or receiving a selection of historical constraint price data for that one transmission element or group of transmission elements for time increments that are coincident with the occurrence of the weather pattern as determined from the historical weather data;

calculating a constraint price based on the weather correlated historical constraint price data for one or more of the time increments in the future for the transmission element or groups of transmission elements; and making accessible electronically the constraint price.

5. The system as defined in claim 4 wherein the algorithm is one selected from the group of summing, averaging, calculating a standard deviation, calculating a median.

6. A system for facilitating trading derivatives of energy constraints, comprising:

one or more computers, comprising memory, wherein the memory stores computer-readable instructions that, when executed, cause the one or more computers to perform the steps:

obtaining constraint price data for the selected transmission element or group of transmission elements for that period of time by accessing electronically constraint price data for a selected period of time for a selected transmission element and/or group of transmission elements, with the constraint price data comprising one or more results of calculating for the selected transmission element and/or group of transmission elements an algorithm on constraint prices associated with a number of time increments for the selected transmission element or group of transmission elements within a given period of time;

calculating electronically a volatility for the constraint price data on the selected transmission element or group of transmission elements for the given period of time;

determining an expected constraint price value for the constraint price data on the selected transmission element or group of transmission elements for the given period of time; and one selected from the group of posting a bid and/or an ask for the constraint price data on the selected transmission element or group of transmission elements for the given period of time, and determining an option price for a strike price on the selected transmission element or group of transmission elements for the given period of time.

7. A method for facilitating trading derivatives of energy constraints, comprising:

obtaining electronically, by one or more computers, historical constraint price data on transmission elements or groups of transmission elements over a number of respective time increments;

obtaining constraint price data for the one transmission element or group of transmission elements for the given period of time by performing electronically, by the one or more computers, an algorithm calculation on the constraint prices for one of the transmission elements or one of the groups of transmission elements over a number of time increments within a given period of time;

obtaining constraint price data for each of the plurality of transmission elements or groups of transmission elements for the plurality of periods of time by performing, by the one or more computers, this algorithm calculation step for a plurality of the periods of time; and making accessible, by the one or more computers, the constraint price data calculating, by the one or more computers, buy or sell offers based at least in part on binding constraints for one or more periods of time for one or more transmission elements and/or groups of transmission elements; and sending electronically to one or more electronic addressees the buy or sell offers based at least in part on binding constraints for one or more periods of time for one or more transmission elements and/or groups of transmission elements.

8. The method as defined in claim 7, wherein the algorithm is one selected from the group of summing, averaging, calculating a standard deviation, calculating a median.

9. A method for facilitating trading derivatives of energy constraints, comprising:

obtaining the constraint price data for the selected transmission element or group of transmission elements for that period of time by accessing electronically, by one or more computers, constraint price data for a selected period of time for a selected transmission element and/or group of transmission elements, with the constraint price data comprising one or more results of calculating for the selected transmission element and/or group of transmission elements an algorithm on constraint prices associated with a number of time increments for the selected transmission element or group of transmission elements within a given period of time;

calculating electronically, by the one or more computers, a volatility for the constraint price data on the selected transmission element or group of transmission elements for the given period of time;

determining, by the one or more computers, an expected constraint price value for the constraint price data on the selected transmission element or group of transmission elements for the given period of time; and one selected from the group of posting, by the one or more computers, a bid and/or an ask for the constraint price data on the selected transmission element or group of transmission elements for the given period of time, and determining, by the one or more computers, an option price for a strike price on the selected transmission element or group of transmission elements for the given period of time.

* * * * *